United States Patent [19]

Mueller

[11] Patent Number: 5,112,943

[45] Date of Patent: May 12, 1992

[54] PREPARATION OF HIGH PURITY POLYMERS OF TETRAHYDROFURAN

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 591,061

[22] Filed: Oct. 1, 1990

[51] Int. Cl.$^5$ .............................................. C08G 65/20
[52] U.S. Cl. .................................... 528/483; 528/408
[58] Field of Search ............... 528/403, 408, 417, 480, 528/483

[56] References Cited

U.S. PATENT DOCUMENTS

| | | | |
|---|---|---|---|
| 2,751,419 | 6/1956 | Hill, Jr. et al. | 568/617 |
| 3,935,252 | 7/1976 | Tomomatsu | 568/617 |
| 4,189,566 | 2/1980 | Mueller et al. | |
| 4,243,799 | 1/1981 | Mueller et al. | 528/409 |
| 4,480,124 | 10/1984 | Mueller | 560/248 |
| 4,803,299 | 2/1989 | Mueller | 560/240 |
| 4,952,673 | 8/1990 | Mueller | 528/483 |

FOREIGN PATENT DOCUMENTS

| | | |
|---|---|---|
| 0061668 | 6/1985 | European Pat. Off. |
| 0241890 | 10/1987 | European Pat. Off. |
| 2801792 | 7/1979 | Fed. Rep. of Germany |

*Primary Examiner*—John Kight, III
*Assistant Examiner*—Shelley A. Wright
*Attorney, Agent, or Firm*—John H. Shurtleff

[57] ABSTRACT

A process is described for the preparation of high purity polymers or copolymers obtained by cationic polymerization of tetrahydrofuran and, if desired, alkylene oxide, in which hydrogen having a bubble diameter of less than 50 $\mu$m is passed into the polymers in the presence of a hydrogenation catalyst.

5 Claims, No Drawings

PREPARATION OF HIGH PURITY POLYMERS OF TETRAHYDROFURAN

The present invention relates to a process for the preparation of high purity polymers or copolymers obtained by cationic polymerization of tetrahydrofuran (THF) or by cationic copolymerization of THF and alkylene oxide.

It is known that the polymerization of THF in the presence of carboxylic anhydrides and strong acids gives polytetramethylene ether glycol or the corresponding diesters. Polytetrahydrofurans (PTHF) of this type, like the copolymers obtainable by copolymerizing THF with alkylene oxides, such as ethylene oxide or propylene oxide, have molecular weights of >200. They are used, in particular, for the preparation of polyurethanes.

As extensive studies have shown, only few acidic catalysts are suitable for the polymerization of THF on an industrially economical scale, but these have the disadvantage that the polymers obtained have a yellow to brownish discoloration, which increases with the temperature of the polymerization. In addition, the purity of the PTHF also depends on the quality of the THF employed.

Technical grade THF contains small amounts of impurities in a concentration of from 10 to 500 ppm. The chemical nature of these impurities is not known in any great detail. Although this THF is of very high purity (normally 99.9%), even only traces of impurities in the polymerization cause the abovementioned discoloration. In addition, a modified reactivity in the preparation of polyesters or polyurethanes from the polytetramethylene ether glycol is observed at the same time as the discoloration. These are very serious problems, since color and reproducible processing are amongst the most important properties of a polymer intended for industrial use.

Numerous processes have therefore been proposed for treating technical grade THF in order to improve the quality. Thus, for example, DE-A 2 801 792 describes a process in which THF is treated with bleaching earths before the polymerization Although this treatment method gives polymers having an improved color index, it cannot be used reproducibly in all cases for all available technical grades of THF.

According to EP-A-61 668, polytetramethylene ether glycol or glycol diesters having a low color index are prepared by treating the polymers obtained by cationic polymerization of THF with hydrogen in the presence of a hydrogenation catalyst. If a commercial grade of THF is used in the polymerization, it is necessary to carry out the hydrogenating decoloration at very high hydrogen pressures of, for example, from 50 to 300 bar. This high-pressure process is also expensive for continuous operation, since, for example, a considerable amount of compression energy must be used for the hydrogen circulation gas.

In many cases, it is even necessary to use expensive noble metal catalysts. The catalysts required frequently have a short service life. Similar restrictions also apply to the decoloration/purification of polymers by treatment with activated charcoal, as described in U.S. Pat. No. 3,935,252 and U.S. Pat. No. 2,751,419. These processes require considerable investment in equipment and, in addition, involve not insignificant costs for the use of the activated charcoal, which, moreover, has only a limited purification capacity.

Since the various impurities in THF which result in discoloration in the end products cannot usually be defined accurately, and it is hardly possible, even after analysis, to predict whether the quality of the THF used and possibly pretreated is sufficiently suitable for the polymerization that polymers conforming with specification are obtained, considerable difficulties arise in the large-scale industrial production of PTHF in ensuring that reject production is avoided.

EP-A-241 890 proposes carrying out the polymerization of THF with carboxylic anhydride as telogen and bleaching earth as catalyst in the presence of small amounts of alkylene oxides. However, the latter, such as ethylene oxide or propylene oxide, are potentially very hazardous substances. Ethylene oxide, which is preferred, has been identified as a carcinogen in animal experiments and can therefore only be handled with considerable inconvenience in order to ensure workplace safety. In addition, it must be ensured that no residues of this hazardous chemical, which is virtually undetectable in the polymer, remain in the end products, which is scarcely possible.

We have found that particularly advantageous results are obtained in the preparation of high purity polymers or copolymers obtained by cationic polymerization of tetrahydrofuran and, if desired, alkylene oxide in which the polymers are treated with hydrogen in the presence of a hydrogenation catalyst in order to reduce the color index if the hydrogen is passed into the polymer with a bubble diameter of less than 50 μm, preferably less than 30 μm, in particular less than 10 μm.

Using the novel process, high purity PTHF having a low color index can be prepared reliably and reproducibly.

An example of a suitable method of converting the hydrogen employed into microbubbles is to use a highly porous sintered material having a pore width of <50 μm, preferably <30 μm, in particular <10 μm. Such materials comprise, for example, glass, stainless sintered steel, sintered bronze, nickel or corrosion-resistant alloys, like the metal alloys available commercially under the trade names Hastelloy ®, Monel200, Inconel ®, Incoloy ® and Tital ®. These sintered materials are usually prepared by powder metallurgy and therefore have a pore size distribution, which, together with the pore width, effects the dispersion of the hydrogen to give microbubbles of said size and thus causes the particular effectiveness of decoloration by hydrogenation.

The novel process can be used for all THF polymers obtained by cationic polymerization of THF or by cationic copolymerization of THF and alkylene oxides, such as ethylene oxide or propylene oxide. The starting material for the process can be a commercially available grade of THF; it is unimportant whether the THF has been prepared from acetylene and formaldehyde, maleic anhydride, allyl alcohol or butadiene. The polymers are, in particular, polytetramethylene ether glycols or polytetramethylene ether glycol diesters. A very wide variety of initiator systems can be used in the preparation of the esters. These determine the end groups of the polymers obtained primarily. Industrially important polymers are those which contain hydrolyzable end groups, such as ester groups of carboxylic acids or sulfonic acids.

Since the principal area of use of polytetramethylene ether glycol diesters, the polyurethane sector, requires the polymer to have hydroxyl end groups, the ester-containing polymers are hydrolyzed after the polymerization.

It is a particular advantage of the present process that the hydrogenation treatment can be completed before the primary polymers are reacted, so that these too, if necessary, can be obtained in colorless, pure form. It is of course also possible to treat the hydroxyl-containing polymers by hydrogenation with equal success.

The THF polymers are treated with the finely divided hydrogen in the presence of a hydrogenation catalyst at atmospheric pressure or under a superatmospheric pressure of up to 40 bar, preferably up to 25 bar. Since the use of hydrogen pressures of greater than 10 bar has no measurable advantages over hydrogenation in the range from atmospheric pressure to 10 bar, the hydrogenation is expediently carried out at hydrogen pressures of less than 15 bar, in particular from 5 to 12 bar. The hydrogenation is carried out at room temperature or elevated temperatures of, for example, from 50° to 170° C. Since temperatures above 100° C. cause no particular improvement in color, hydrogenation at from 70° to 120° C. is preferred.

The polymers to be treated can be employed directly or dissolved in solvents. It is an unexpected and not easily explained finding that better results are obtained when solvent-free polymers are employed than is the case with dissolved products. A solvent-free embodiment of the process is therefore preferred, in which the hydrogenation reactor is either filled with a fixed catalyst bed, which is completely covered with the polymer to be hydrogenated, or the polymer to be hydrogenated contains the suspended catalyst. The hydrogen is expediently fed into the liquid phase at the lowest point of the reactor via a device which generates the finely divided hydrogen, such as a highly porous sintered material.

Conventional hydrogenation catalysts, such as metals of the eighth subgroup, in particular nickel, are used. Catalysts containing the metals cobalt, iron, copper and the noble metals ruthenium, palladium and platinum are also highly suitable. The metals can be used in pure form, eg. as Raney metals, or, for example, as reduced oxides. The catalysts may also contain the hydrogenation metals on suitable carriers, such as aluminum oxide, titanium dioxide, silicon dioxide, pumice, bentonite or, for example, magnesium silicate. Catalysts which contain non-noble metals, such as iron, cobalt, nickel and copper, are expediently converted into the active form before use by reduction using hydrogen. When noble metal catalysts are used, this operation is superfluous in most cases. Nickel is the preferred hydrogenation catalyst.

The novel process allows THF polymers which usually have color indices of from about 40 to 150 on the Hazen scale to be decolored reliably and effectively to give color indices of from 5 to 40. The yellowish or brownish color primarily present in the polymers disappears almost instantaneously, to give colorless products having an acid number of 0. Compared to the hydrogen treatment described in European Patent 61 668, in which intensely colored THF polymers are not or only inadequately decolored even at hydrogen pressures of greater than 200 bar, these polymers can be decolored smoothly by the process according to the invention even at hydrogen pressures of less than 15 bar. The acid number in the polymers is reduced to 0 at hydrogen pressures of only from 1 to 20 bar; using conventional processes, this can only be achieved at hydrogen pressures of 30 bar or more.

It is surprising that hydrogen which, when used according to the invention, is finely distributed, for example by sintered materials, proves to be so much more effective in the decoloration of THF polymers than a stream of hydrogen which is finely distributed in the polymer in conventional hydrogenation plants, for example by nozzles. This is because the liquid is in the latter case forced through the nozzle at such a rate that shear forces in the region of the gas/liquid interface and in the layers in the vicinity of the catalyst result in an extraordinary increase in material transfer. Thus, it is stated in Chemieanlagen und Verfahren, Issue 3/1971, p. 50: "The principal resistance to material transfer is usually found in the region of the laminar interface layer on the catalyst. If increased shear forces succeed in breaking up this layer, a considerable increase in the hydrogenation rate can be expected". No increased shear forces occur in the vicinity of the catalysts when highly porous sintered materials are employed according to the invention for the dispersion of the hydrogen. As shown by a comparative example, adequate decoloration of the THF polymer is not achieved if the hydrogen is passed into the polymer via a nozzle of conventional design.

In the hydrogenation treatment according to the invention, which takes place under very mild conditions, the amount of hydrogen consumed for the decoloration is immeasurably small. Since the impurities originally present in the polymer which cause the coloration and acid number are of unknown chemical nature and are in a virtually undetectable concentration, it is impossible to determine the manner in which the methods according to the invention act on the polymer.

In the examples, parts are by weight, and bear the same relation to parts by volume as that of the kilogram to the liter. The APHA methods of determining color indices are described in the DIN 53 409 and ASTM-D-1209 standards.

EXAMPLE 1

Technical grade tetrahydrofuran was polymerized, without pretreatment, by the method of Example 3 in German Laid-Open Application DE-OS 29 16 653, giving a polytetramethylene ether glycol diacetate of molecular weight 650 and color index 100 APHA. A sample of the product was converted into the polytetramethylene ether glycol by hydrolysis; the latter had a color index of 110 APHA and an acid number of 0.05 mg of KOH/g.

The polytetramethylene ether glycol diacetate leaving the reactor was freed from unreacted THF by distillation under reduced pressure. The purification according to the invention by hydrogenation was carried out in a vertical reaction tube with a capacity of 1000 ml. The ratio between the diameter and the length of the reaction tube was 1:40. The catalyst in the tube was a nickel/aluminum alloy (42% by weight of nickel and 58% by weight of aluminum) with a grain size of from 2.5 to 3.5 mm, prepared as detailed in German Patent 20 04 611 by treatment with 0.5% strength by weight aqueous sodium hydroxide solution, 25% by weight of the original aluminum being removed.

The hydrogen was introduced at the bottom of the reaction tube via a sintered stainless steel cartridge with an internal diameter of 17 mm, an external diameter of 22 mm and a length of 150 mm. The sintered cartridge is commercially available under the name Sika R 3 (manufacturer: Sintermetall-Werk Krebsöge GmbH, 5608 Radevormwald 1), and has a pore width of 3 μm.

The polytetramethylene ether glycol diacetate was passed through the catalyst bed from bottom to top, and at the same time 40 l (s.t.p.)/h hydrogen were passed into the reaction tube at a pressure of 8 bar and discharged as offgas. The weight hourly space velocity on the catalyst was 0.5 kg/l h, and the reaction temperature was 100° C. The polytetramethylene ether glycol diacetate leaving the reactor had a color index of less than 5 APHA and an acid number of 0 mg of KOH/g. A sample of the product was converted into the polytetramethylene ether glycol by hydrolysis; the latter had a color index of again less than 5 APHA.

EXAMPLE 2

Example 1 was repeated, but the catalyst employed was a supported catalyst containing 25% by weight of nickel on 75% by weight of silica gel at an hourly space velocity of 400 ml/l h. The polymer obtained had a color index of less than 5 APHA.

EXAMPLE 3

Example 1 was repeated at atmospheric pressure, using a nickel catalyst sold by Mallinckrodt Inc., St. Louis, Mo., USA, under the name E 474 TR (about 50 to 60% of nickel). Before decoloring by hydrogenation, the catalyst was reactivated using hydrogen at 200° C. and atmospheric pressure. The hydrogen (50 l (s.t.p.)/h) was distributed in the hydrogenation reactor as described. A polytetramethylene ether glycol diacetate having a color index of 5 APHA was obtained.

If the hydrogen was passed through a Sika R 30 sintered metal cartridge of pore width 30 μm, a polymer having a color index of 40 APHA was obtained.

EXAMPLE 4

(Comparison)

Example 1 was repeated, but the hydrogen was passed into the reactor through an aperture with a diameter of 3 mm. The polytetramethylene ether glycol diacetate was decolored to 80 APHA. Doubling the residence time of the product in the hydrogenation reactor had no further decoloring effect.

EXAMPLE 5

(Comparison)

Example 3 was repeated, but the hydrogenation was carried out at a hydrogen pressure of 20 bar. The reactor contained, in place of the sintered metal material, a nozzle as shown in CAV 1971, March, page 49, in FIG. 2.

The PTHF diacetate fed to the nozzle by means of a pump was removed from the top of the hydrogenation reactor. The hourly amount fed back into the reactor in this way was 50 times the reactor volume. Approximately the same amount of hydrogen offgas was removed from the reactor as PTHF diacetate was fed back from the hydrogenation reactor. The weight hourly space velocity was 0.5 kg/l. The PTHF diacetate leaving the hydrogenation had a color index of 25 APHA, although the process was carried out at a hydrogen pressure of 20 bar.

We claim:

1. A process for the preparation of a high purity polymer or copolymer obtained by cationic polymerization of tetrahydrofuran and, if desired, an alkylene oxide, in which the polymer is treated with hydrogen in the presence of a hydrogenation catalyst in order to reduce the color index, which comprises passing the hydrogen into the polymer with a bubble diameter of less than 50 μm.

2. A process as claimed in claim 1, wherein the hydrogen is passed into the polymer through a highly porous sintered material having a pore width of less than 50 μm.

3. A process as claimed in claim 2, wherein the sintered material has a pore width of less than 10 μm.

4. A process as claimed in claim 1, wherein the hydrogenation is carried out at a hydrogen pressure of less than 15 bar.

5. A process as claimed in claim 1, wherein the hydrogenation is carried out at a hydrogen pressure of from 5 to 12 bar.

* * * * *

UNITED STATES PATENT AND TRADEMARK OFFICE
CERTIFICATE OF CORRECTION

PATENT NO. : 5,112,943
DATED : May 12, 1992
INVENTOR(S) : Herbert Mueller

It is certified that error appears in the above-identified patent and that said Letters Patent is hereby corrected as shown below:

ON THE FIRST PAGE:

Please insert the following priority information:

-- [30] Foreign Application Priority Data

Oct. 27, 1989 [DE] Fed. Rep. of Germany ... 3935750 -- after item [22] Appl. No. .

Signed and Sealed this

Twentieth Day of July, 1993

Attest:

MICHAEL K. KIRK

*Attesting Officer*   *Acting Commissioner of Patents and Trademarks*